United States Patent
Masutani

(10) Patent No.: US 8,585,139 B2
(45) Date of Patent: Nov. 19, 2013

(54) VEHICLE SEAT

(75) Inventor: Eiji Masutani, Tochigi (JP)

(73) Assignee: TS Tech Co., Ltd., Tochigi (JP)

(*) Notice: Subject to any disclaimer, the term of this patent is extended or adjusted under 35 U.S.C. 154(b) by 321 days.

(21) Appl. No.: 13/036,250

(22) Filed: Feb. 28, 2011

(65) Prior Publication Data

US 2011/0210586 A1 Sep. 1, 2011

(30) Foreign Application Priority Data

Mar. 1, 2010 (JP) ................... 2010-043964

(51) Int. Cl.
*B60N 2/42* (2006.01)

(52) U.S. Cl.
USPC ............... 297/216.2; 297/216.1; 297/216.16; 297/480

(58) Field of Classification Search
USPC .............. 297/216.1, 216.16, 216.2, 480
See application file for complete search history.

(56) References Cited

U.S. PATENT DOCUMENTS

| | | | |
|---|---|---|---|
| 5,908,219 A * | 6/1999 | Bohmler | 297/216.1 |
| 6,050,635 A * | 4/2000 | Pajon et al. | 297/216.1 |
| 6,076,887 A * | 6/2000 | Andersson | 297/216.1 |
| 6,755,469 B2 * | 6/2004 | Akaike et al. | 297/344.15 |
| 6,935,684 B2 * | 8/2005 | Sakai | 297/216.1 |
| 7,413,246 B2 * | 8/2008 | Saiguchi et al. | 297/216.12 |
| 8,109,568 B2 * | 2/2012 | Masutani | 297/216.15 |
| 2011/0121621 A1 * | 5/2011 | Masutani | 297/216.1 |

FOREIGN PATENT DOCUMENTS

| | | |
|---|---|---|
| EP | 2 154 019 | 7/2010 |
| JP | 2008-213546 | 8/2008 |

* cited by examiner

*Primary Examiner* — Peter Brown
(74) *Attorney, Agent, or Firm* — Hamre, Schumann, Mueller & Larson, P.C.

(57) ABSTRACT

A seat bottom of a vehicle seat includes a base portion, a movable frame configured to be movable in a front-rear direction relative to the base portion, a tension generator and a tension transmission member. The tension transmission member connected at one end of its first portion with the tension generator is bifurcated at another end of a first portion into a second portion connected with a seat belt anchor or a seat belt buckle and a third portion connected with the movable frame. Upon activation of the tension generator, the third portion pulls the movable frame rearward and at the same time the second portion pulls the seat belt anchor or the seat belt buckle.

20 Claims, 9 Drawing Sheets

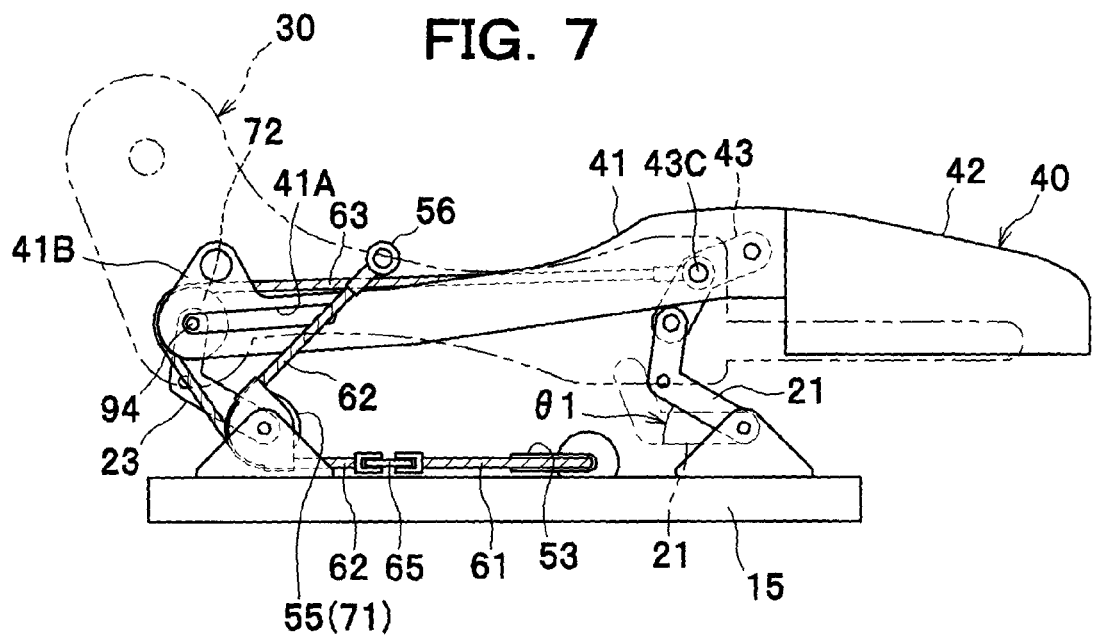
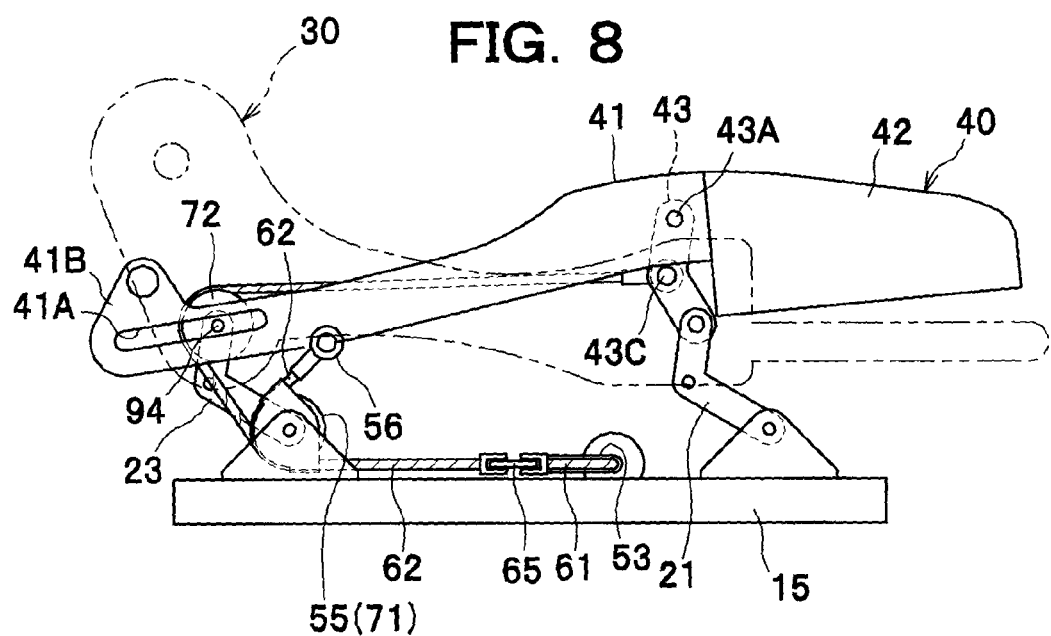

VEHICLE SEAT

CROSS-REFERENCE TO RELATED APPLICATION(S)

This application claims priority from Japanese Patent Application No. 2010-043964 filed on Mar. 1, 2010, the disclosure of which is incorporated herein by reference in its entirety.

BACKGROUND

The present invention relates generally to a vehicle seat such as a car seat, and particularly to a vehicle seat having a seating surface configured to be moved in response to a frontal crash.

A car seat (vehicle seat) having a seat bottom with a seating surface configured to be moved rearward in response to a frontal crash such that a car collides head-on against another car or other object is known in the art. For example, the inventor of this application previously proposed in his prior patent application published under JP 2008-213546 A (corresponding European patent application was published under EP 2154019 A1) a vehicle seat having a pretensioner (gas cylinder) disposed with its axial direction oriented in a right-left direction of a vehicle to thereby move the seating surface rearward. The vehicle seat disclosed in this publication has another pretensioner (gas cylinder) provided for the purpose of promptly pulling a seat belt in upon detection of a frontal crash of the vehicle.

Providing two dedicated gas cylinders in a vehicle seat as above would have several disadvantages which may include complicated wire arrangement, upsizing of the mechanism and associated increase in the weight of the vehicle seat.

With this in view, there is a need to provide an improved vehicle seat with a simple and compact mechanism by which a seating surface is moved and a seat belt is pulled in upon detection of a frontal crash of a vehicle.

SUMMARY

In one aspect, a vehicle seat is provided which comprises a seat bottom with a seating surface configured to be moved in response to an impact from a direction corresponding to a front side of an occupant sitting on the seating surface in a crash of a vehicle. The seat bottom includes a base portion configured to be supported at a position fixed relative to a body of the vehicle, a movable frame configured to be movable together with the seating surface in a front-rear direction relative to the base portion, a tension generator provided at the base portion and configured to be activated in response to the impact, and a tension transmission member. The tension transmission member includes a first portion, a second portion and a third portion. The tension transmission member is connected at one end of the first portion with the tension generator, and bifurcated at another end of the first portion into the second and third portions which another end of the first portion is connected with one end of the second portion and with one end of the third portion. The tension transmission member is connected at another end of the second portion with a seat belt anchor or a seat belt buckle and connected at another end of the third portion with the movable frame. A tension generated by the tension generator activated causes the third portion of the tension transmission member to pull the movable frame rearward and at the same time causes the second portion of the tension transmission member to pull the seat belt anchor or the seat belt buckle.

With this configuration, when the first portion of the tension transmission mechanism is pulled by the tension generator, the second and third portions are pulled so that the third portion pulls the movable frame and causes the seating surface (with the seat bottom) to move rearward, and at the same time the second portion pulls the seat belt anchor or the seat belt buckle and causes the seat belt to be pulled in. Accordingly, the both of the movable frame and the seat belt can be actuated by a single device (i.e., the tension generator). Such a simple configuration may contribute to prevention of increase in size and weight of the vehicle seat.

In the vehicle seat described above, the base portion may be configured to include an anchor portion, a base frame and a height adjustment mechanism. The anchor portion is configured to be fixed to the body of the vehicle. The base frame is coupled with the movable frame in a manner that permits the movable frame to move frontward and rearward relative to the base frame. The height adjustment mechanism is configured to provide a connection between the anchor portion and the base frame in a manner that enables an adjustment of a height of the base frame. The tension generator may be provided at the anchor portion of the base portion, or at the base frame. Premised on this configuration, if the tension generator is provided at the anchor portion of the base portion, which is of a high rigidity enough to support the seat bottom, the operation of the tension generator (actuating the seat belt and the movable frame via the tension transmission member) can be carried out in a stable manner. Alternatively, if the tension generator is provided at the base frame, the operation of pulling the tension transmission member can be rendered impervious to the result of the adjustment of the height of the base frame by means of the height adjustment mechanism, so that the effect of the operation of the tension generator can be stabilized with a simplified design in the arrangement of the tension transmission member.

The vehicle seat with the height adjustment mechanism as described above which may include a front link and a rear link which are joined with the anchor portion and the base frame in such a manner that the front link, the rear link, the anchor portion and the base frame form a four-bar linkage which may be configured to further comprise a first guide disposed at and coaxially with a nodal point between the rear link and the anchor portion, and a second guide disposed at and coaxially with a nodal point between the rear link and the base frame, wherein the third portion extending from the one end thereof at which the tension transmission member is bifurcated is looped around the first guide and the second guide in this order, directed at the second guide toward frontward, wherein the another end of the third portion is connected with the movable frame. With this configuration, even if the tension generator is designed to be located under the height adjustment mechanism, the third portion of the tension transmission member can be provided in such an arrangement that interference of the third portion with the height adjustment mechanism being actuated and the base frame moving upward and downward in accordance with the motion of the actuated height adjustment mechanism can be avoided.

The vehicle seat with the four-bar linkage as described above may be configured according to one embodiment such that the four-bar linkage described above is a parallel linkage and radii of curvature of surfaces of the first and second guides around which the third portion of the tension transmission member is looped are equal to each other. With this configuration, the length of the third portion routed from its one end around the first and second guides to the movable frame does not change before and after the upward/downward movement of the base frame. Therefore, the change of the tension of the third portion after the height adjustment can be prevented, and thus excessive tension or excessive looseness of the third portion can be prevented.

The vehicle seat with the four-bar linkage as described above may be configured according to another embodiment such that the four-bar linkage is a non-parallel linkage in which opposite links of at least one of two pairs have lengths different from each other, and which is configured to tilt a front end of the base frame downward according as the base frame is moved toward a higher position by means of the height adjustment mechanism, and a radius of curvature of a surface of the second guide around which the third portion of the tension transmission member is looped is greater than that of a surface of the first guide around which the third portion of the tension transmission member is looped, whereby a tension of the tension transmission member is less prone to change before and after operation of the height adjustment mechanism.

Alternatively, the vehicle seat with the four-bar linkage as described above may be configured according to yet another embodiment such that the four-bar linkage is a non-parallel linkage in which opposite links of at least one of two pairs have lengths different from each other, and which is configured to tilt a front end of the base frame upward according as the base frame is moved toward a higher position by means of the height adjustment mechanism, and a radius of curvature of a surface of the second guide around which the third portion of the tension transmission member is looped is smaller than that of a surface of the first guide around which the third portion of the tension transmission member is looped, whereby a tension of the tension transmission member is less prone to change before and after operation of the height adjustment mechanism.

In the vehicle seat as described above, the tension generator may preferably but not necessarily be disposed under the seat bottom. This arrangement makes good use of the space under the seat bottom, and thus serves to realize a compact design of the vehicle seat.

The vehicle seat as described above may further comprise a bifurcation bracket by means of which the first, second and third portions of the tension transmission member are connected together. This bifurcation bracket may include a first connecting portion with which the first portion is connected, a second connecting portion with which the second portion is connected, and a third connecting portion with which the third portion is connected. The bifurcation bracket may be configured such that the first, second and third connecting portions are located at apexes of a triangle. Preferably but not necessarily, an interior angle of this triangle formed at the first connecting portion is an obtuse angle.

In the bifurcation bracket, the first connecting portion may be located in a position closer to a point from which a force in a direction of the first portion pulling the bifurcation bracket comes than the second and third connecting portions, and the second and third connecting portions may be arranged at both sides of the first connecting portion. In other words, the second and third connecting portions may be arranged laterally.

With these configurations, the first, second and third portions are connected by the bifurcation bracket. When the tension generator is activated to pull the first portion, the first portion pulls the first connecting portion of the bifurcation bracket. Force pulling the first connecting portion is distributed into the second and third connecting portions arranged at the both sides of the first connecting portion, so that the second and third portions are pulled through the second and third connecting portions. Accordingly, either of the second and third connecting portions that first receives a load causes the bracket to turn about the first connecting portion, so that the tension of one of the second and third portions that has initially received the greater load is lessened and the tension of the other of the second and third portions that has initially received the smaller load is increased. In this way, two portions (i.e., the second and third portions) can be pulled with a force from a single portion (i.e., the first portion) being equally distributed thereto.

In the vehicle seat as described above, the second portion of the tension transmission member may be located in a position laterally outside the third portion of the tension transmission member. Since the seat belt anchor and the seat belt buckle are located in a laterally outside position of the vehicle seat in ordinary cases, the arrangement of the second portion in a position laterally outside the first portion in the vehicle seat may be reasonable in view of its advantageous compactness in arrangement, as well as prevention of interference between the portions of the tension transmission member and between the tension transmission member and the other parts arranged in vicinity thereof.

BRIEF DESCRIPTION OF THE DRAWINGS

The above aspects and advantages, other advantages and further features of the present invention will become more apparent by describing in detail illustrative, non-limiting embodiments thereof with reference to the accompanying drawings, in which:

FIG. 7 is a side view of the principal portion of the car seat in the higher position before activation of the gas cylinder;

FIG. 8 is a side view of the principal portion of the car seat in the higher position after activation of the gas cylinder;

DETAILED DESCRIPTION OF THE EMBODIMENTS

A detailed description will be given of an illustrative embodiment of the present invention with reference to the drawings.

Figure 1:
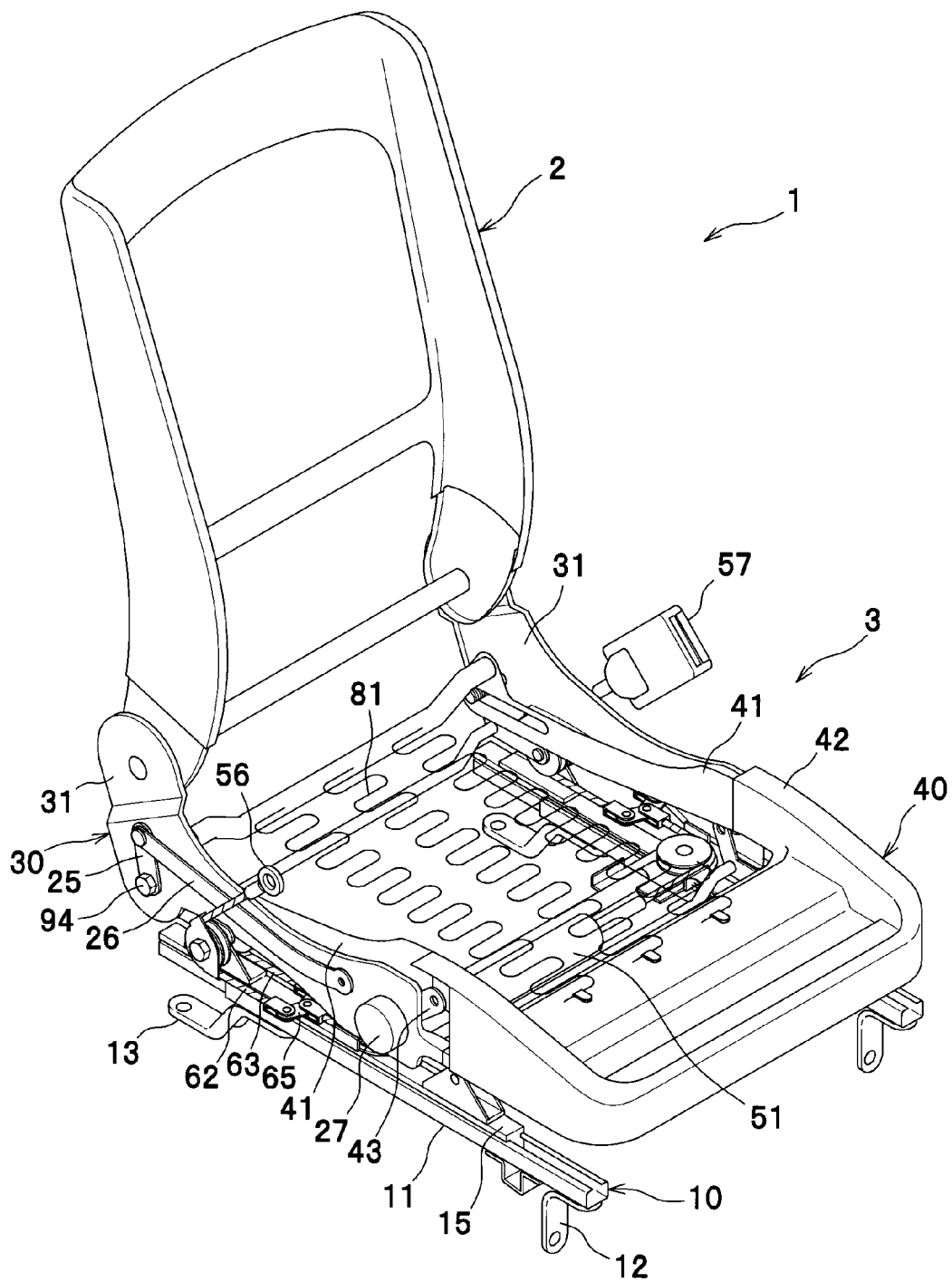
FIG. 1 is a general perspective view of a seat frame of a car seat.

A car seat as one example of a vehicle seat of the present invention includes a seat frame 1 as shown in FIG. 1, and an outside of the seat frame 1 is covered with a seat cushion made of urethane foam or the like. The seat frame 1 includes a seat back frame 2 and a seat bottom frame 3. In describing the embodiment, the front/rear, left/right (lateral) and upper/lower (upward/downward) directions are designated as from the viewpoint of an occupant who is sitting on the seat.

Figure 2:
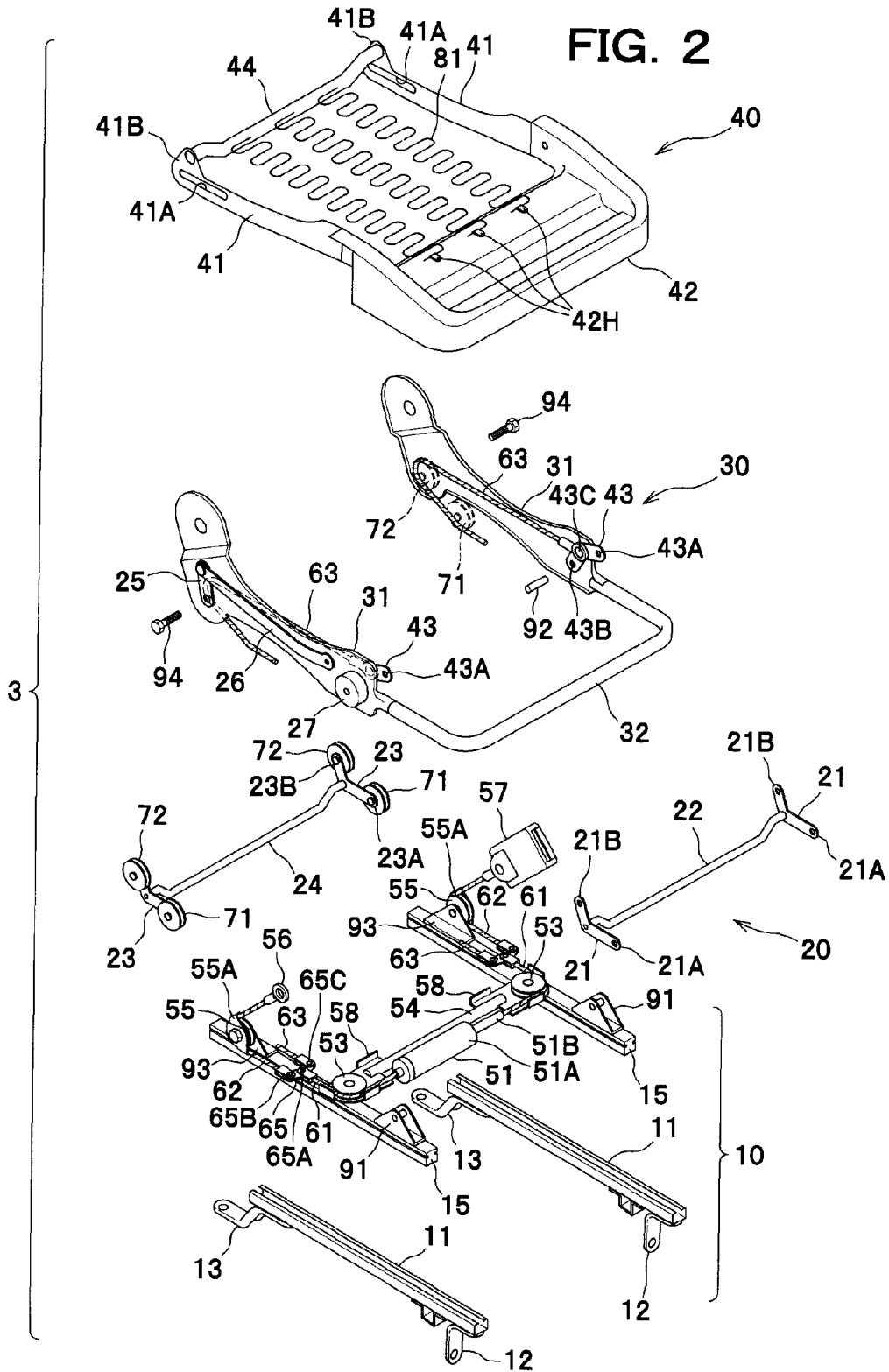
FIG. 2 is an exploded perspective view of a seat bottom in the seat frame.

As shown in FIG. 2, the bottom frame 3 principally includes a rail slider device 10 as one example of an anchor portion, a height adjustment mechanism 20, a base frame 30, a movable frame 40 and a gas cylinder 51 as one example of a tension generator. The rail slider device 10 is configured to be fixed to a floor of a car body (vehicle body) so that the seat bottom of the seat is fixed to the floor. The height adjustment mechanism 20 is configured to enable an adjustment of a height of seating surface of the seat bottom (a height of the base frame 30). The gas cylinder 51 is configured to be activated in response to an impact in the event of a frontal crash and to cause a pretensioner device and a seating surface moving device to be actuated so that a seat belt is pulled and the movable frame 40 is moved rearward at the same time in the frontal crash. The rail slider device 10 and the base frame 30 constitute an assembly serving as one example of a base portion. The movable frame 40 is configured to be moved rearward relative to the base frame 30 in the frontal crash. In the following description, the state of the seat or each part of the seat before activation of the gas cylinder 51 in the frontal crash will be referred to as "normal state", whereas the state thereof after activation of the gas cylinder 51 may be referred to as "post-activation state" where appropriate. It is to be understood that configuration being described hereinbelow is in the normal state unless otherwise noted.

The rail slider device 10 principally includes a pair of rails 11 and a pair of sliders 15. The rails 11, each having a shape elongated in the front-rear direction, are disposed in parallel separately at a right side and a left side in the seat bottom frame 3. Each rail 11 is fixed to the floor of the vehicle body (the body of the vehicle) via a front bracket 12 and a rear bracket 13.

Each slider 15 having a shape elongated in the front-rear direction is mounted at the corresponding rail 11 and configured to be able to be slid along the rail 11. The sliders 15 are configured to support the base frame 30 via the height adjustment mechanism 20.

The height adjustment mechanism 20 includes a front link 21 and a rear link 23. A lower end portion 21A of the front link 21 and a lower end portion 23A of the rear link 23 are pivotally joined with the slider 15. An upper end portion 21B of the front link 21 and an upper end portion 23B of the rear link 23 are pivotally joined with the base frame 30. Thus, the front link 21, the rear link 23, the slider 15 and the base frame 30 form a four-bar linkage which enables the base frame 30 to be moved upward and downward relative to the slider 15.

To be more specific, two front links 21 are provided at the right side and at the left side, respectively, and the lower end portion 21A of each front link 21 is pivotally supported on a metal fitting 91 provided at a front end portion of the slider 15. The right and left front links 21 are connected by a front link connecting pipe 22, with a right end of the front link connecting pipe 22 being fixed to a middle portion (located substantially at a center) of the right front link 21 and a left end of the front link connecting pipe 22 being fixed to a portion (located substantially at a center) of the left front link 21. With this front link connecting pipe 22, the right and left front links 21 are configured to simultaneously rotate together.

The upper end portion 21B of each front link 21 is pivotally supported by a pin 92 (NB: of two pins 92, only one is illustrated), coaxially with a dial 27 provided at the base frame 30 which will be described later in detail.

In the normal state, each front link 21 is located in a rearwardly tilting position in which the upper end portion 21B is positioned rearwardly of the lower end portion 21A.

Two rear links 23, similar to the front links 21, are provided at the right side and at the to left side, respectively, and the lower end portion 23A of each rear link 23 is pivotally supported on a metal fitting 93 provided at a rear end portion of the slider 15. The upper end portion 23B of each rear link 23 is engaged with a pin 94 which is rotatably engaged with the base frame 30 which will be described later in detail. Similar to the front link 21, each rear link 23, in the normal state, is located in a rearwardly tilting position in which the upper end portion 23B is positioned rearwardly of the lower end portion 23A.

The right and left rear links 23 are connected by a rear link connecting pipe 24, with a right end of the rear link connecting pipe 24 being fixed to a middle portion (located substantially at a center) of the right rear link 23 and a left end of rear link connecting pipe 24 being fixed to a middle portion (located substantially at a center) of the left rear link 23. With this rear link connecting pipe 22, the right and left rear links 23 are configured to simultaneously rotate together.

Figure 3A:
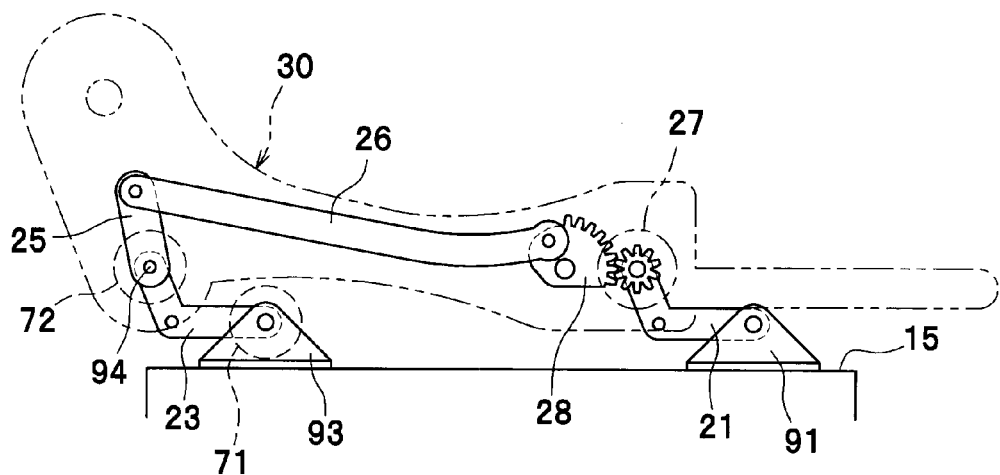
FIG. 3A is a schematic diagram for explaining a height adjustment mechanism, showing a state in which the seat is lowered (in a lower position)
Figure 3B:
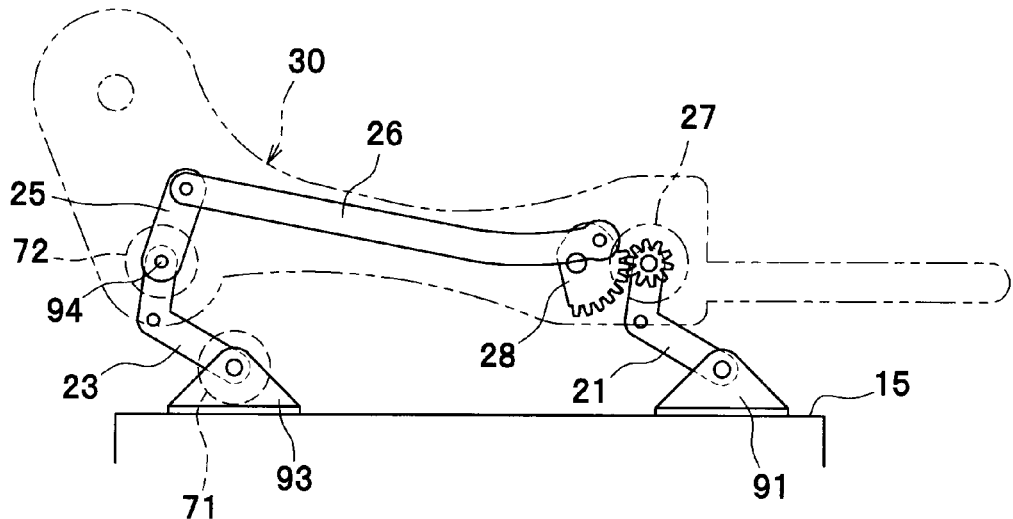
FIG. 3B is a schematic diagram for explaining the height adjustment mechanism, showing a state in which the seat is raised (in a higher position)

The upper end portion 23B of each rear link 23 is engaged with the pin 94 is such a manner that relative rotation of the rear link 23 and the pin 94 is impossible. The pin 94 is engaged with a link 25 which extends upward in such a manner that relative rotation of the pin 94 and the link 25 is impossible. Moreover, as shown in FIGS. 3A and 3B, an upper end portion of the link 25 is pivotally coupled with a rear end portion of an actuator link 26 disposed in the front-rear direction, and a front end portion of the actuator link 26 is pivotally coupled with a sector gear 28 which is configured to be rotatable about an axis fixed relative to the base frame 30. The dial 27 having a gear and operable to rotate the gear is provided at the base frame 30. The gear of the dial 27 and the sector gear 28 mesh with each other. Thus, as the dial is operated to rotate, the rotation is transmitted to the sector gear 28, and causes the sector gear 28 to rotate. The rotation of the sector gear 28 is then transmitted via the actuator link 26 to the link 25, and causes the link 25 to rotate. Since the link 25 and the rear link 23 are fixed relative to each other at a prefixed angle by the pin 94, the motion of the link 25 directly causes the rear link 23 to rotate. Because the front link 21, the rear link 23, the slider 15 and the base frame 30 form a four-bar linkage, the motion of the rear link 23 raised up toward frontward causes the front link 21 to be raised up toward frontward at the same time, and causes the base frame 30 to be lifted up. In this way, the base frame 30 can be moved upward and downward by the normal and reverse rotation of the dial 27 so that an adjustment of the height of the base frame 30 can be made through the operation of the dial 27. In the present embodiment, the lengths of the front link 21 and the rear link 23 (i.e., distances between nodes) are equal to each other, and the length of the slider 15 as a link (i.e., distance between nodes) and the length of the base frame 30 as a link (i.e., distance between nodes) are equal to each other. In other words, these members are configured as links which form a parallel four-bar linkage such that opposite links have the same length and form a parallelogram.

As shown in FIG. 2, the base frame 30 principally includes a pair of side frames 31 forming right and left sidewalls, and a connecting pipe 32 connecting front end portions of the right and left side frames 31. The dial 27 is provided rotatably at the front end portion of the right side frame 31. Coaxially with the dial 27, lifting links 43 are pivotally supported by the pin 92 at the right and left side frames 31. The lifting links 43 serve to lift the movable frame 40 when the movable frame 40 is moved rearward. Each of the lifting links 43 is, in the normal state, in a tilted position with its front end up with respect to the horizontal. An upper end portion of each lifting link 43 is pivotally coupled with the side frame 41 of the movable frame 40. The lifting link 43 includes a connecting portion 43A which is disposed at the upper end portion of the lifting link 43 and at which the lifting link 43 is connected with the movable frame 40, a connecting portion 43B which is disposed at a lower end portion of the lifting link 43 and at which the lifting link 43 is connected with the base frame 30, and a connecting portion 43C which is disposed at a middle portion (located substantially at a center) of the lifting link 43 and at which the lifting link 43 is connected with the third wire 63 which will be described later. The connecting portion 43C for connecting with the third wire 63 is located rearwardly of a straight-line segment connecting the centers of the connecting portions 43A and 43B, so that the force pulling the lifting link 43 by the third wire 63 is efficiently transmitted to the connecting portion 43A without twisting the lifting link 43.

The pin 94 is engaged with the rear end portion of each of the right and left side frames 31 in such a manner that the pin 94 and the side frame 31 can be rotated relative to each other.

The movable frame 40 includes a pair of side frames forming the right and left sidewalls, a pan frame 42 connecting the front end portions of the right and left side frames 41, and a connecting pipe 44 connecting the rear end portions of the right and left side frames 41.

A guide hole 41A elongated in the front-rear direction is formed in the rear end portion of each side frame 41, and the pin 94 is inserted in the guide hole 41A. With this configuration, as the movable frame 40 is moved rearward relative to the base frame 30, the rear end portion of the movable frame 40 is moved along a direction of the length of the elongated guide holes 41A. Furthermore, a protruded portion 41B protruding upward is provided in the rear end portion of each side frame 41.

The pan frame 42 is made of sheet metal by presswork, in which parts of the stamped sheet metal are raised to form hooks 42H whose edges face frontward. Sheet springs 81 are provided between each hook 42H and the connecting pipe 44. Each end of the connecting pipe 44 is coupled with the protruded portion 41B.

The gas cylinder 51, like the pretensioner as disclosed in JP 2008-213546 A, includes a cylinder 51A, a piston (not shown) which moves inside the cylinder 51A, a piston rod 51B axially protruding from the piston to the outside of the cylinder 51A, and a gas generator (not shown). The gas cylinder 51 is arranged with its axis oriented laterally in the right-left direction. An acceleration sensor (not shown) is connected to the gas generator, so that when deceleration of the vehicle at a predetermined value or greater is detected by the acceleration sensor, a predetermined electric signal is provided from the acceleration sensor to the gas generator. When the gas generator receives the predetermined electric signal, the gas generator supplies the cylinder 51A with a gas, and causes the piston rod 51B to move into the cylinder 51A, so that the gas cylinder 51 as a whole shrinks in the axial direction. A first wire 61 as one example of a first portion of a tension transmission member is connected with each end of the gas cylinder 51, that is, one first wire 61 extends rightward from the right end of the cylinder 51A while the other first wire 61 extends leftward from the left end of the piston rod 51B.

A pulley 53 configured to be rotatable about an axis extending in an upward/downward direction is provided at each of the two sliders 15 via a bracket 58. Two first wires 61 connected with the cylinder 51A and the piston rod 51B extend outward to the right and to the left, respectively; each first wire 61 is then looped around the pulley 53 and directed toward rearward. The right and left brackets 58 are connected by a reinforcing pipe 54. With this reinforcing pipe 54, even when a strong tension applied to the two first wires 61 impels the right and left pulleys 53 to move closer to each other, the reinforcing pipe 54 stretched against the brackets 58 (i.e., pulleys 53) withstands this impelling force, so that the distance between the right and left sliders 15 can be maintained properly.

The rear end of each rearwardly-extending first wire 61 is connected with a second wire 62 as one example of a second portion of the tension transmission member and a third wire 63 as one example of a third portion of the tension transmission member. In this embodiment, the first wire 61, the second wire 62 and the third wire 63 are collectively referred to as "connecting wire". The connecting wire corresponds to the tension transmission member as defined in the appended claims. A bifurcation bracket 65 includes a first connecting portion 65A with which the first wire 61 is connected, a second connecting portion 65B with which the second wire 62 is connected, and a third connecting portion 65C with which the third wire 63 is connected. In order to keep the position of the bifurcation bracket 65 from being made unstable by receiving three forces through the first wire 61 pulling the bifurcation bracket 65 at the first connecting portion 65A from the frontward direction, and through the second and third wires 62 pulling the bifurcation bracket 65 at the second and third connecting portions 65B, 65C, respectively, from the rearward direction, the first connecting portion 65A is located in a position closer to a frontward position (a point from which a force in a direction of the first wire 61 pulling the bifurcation bracket 65 comes) than the second and third connecting portions 65B, 65C which are arranged at both sides of the first connecting portion 65A. In this embodiment, the point from which the pulling force in the direction of the first wire 61 pulling the bifurcation bracket 65 comes is the point at which the first wire 61 initially directed laterally (to the right or to the left) and then looped around the pulley 53 and directed toward rearward is separate from the pulley 53. In other words, the first, second and third connecting portions are arranged in such a manner that a straight-line segment connecting the centers of the second connecting portion 65C and the first connecting portion 65A, and a straight-line segment connecting the centers of the first connecting portion 65C and the third connecting portion 65C is shaped like a letter V. As will be described later in more detail, an angle θv at the first connecting portion 65A in the middle of the V-shaped segments (see FIG. 6A) may preferably be an obtuse angle (90-180 degrees) so that the tensions of the wires 61-63 can be effectively adjusted by the rotation of the bifurcation bracket 65 as will be described later. If the angle θv were an acute angle, the motion of the second and third connecting portions 65B, 65C in the pulling directions of the second and third wires 62, 63, which will be caused rotation of the bifurcation bracket 65 would be too small.

With this bifurcation bracket 65, the second wire 62 is located in a position laterally outside the third wire 63. Since the second wire 62 is connected with the seat belt anchor 56 or the seat belt buckle 57 which are located at the left side or the right side of the seat, arrangement of the second wire 62 in a position laterally outside the third wire 63 may be advantageous in that the connecting wires can be arranged compactly, while avoiding interference between the second and third wires 62, 63 and between each of these connecting wires and other part located in their vicinity.

A pretensioner pulley 55 rotatable about a lateral axis is provided at the metal fitting 93 disposed at the rear end portion of each of the two sliders 15. The axis of rotation of the pretensioner pulley 55 is located to coincide with the axis of rotation of the rear link 23 disposed at an end portion 23A of the rear link 23 (hereinafter referred to simply as "nodal point of the lower end portion 23A"; the term "nodal point" will be used for the upper end portion 23B, as well). Each of the two second wires 62 extending in the front-rear direction is looped around the pretensioner pulley 55, and directed toward a frontward and obliquely upward direction. The ends of the right and left second wires 62 are connected with the seat belt anchor 56 and the seat belt buckle 57, respectively. Each pretensioner pulley 55 is provided with a retainer 55A so that the second wire 62 is held between the pretensioner pulley 55 and the retainer 55A and thus can be prevented from coming off from the pretensioner pulley 55. The retainer 55A is configured to hold the second wire 62 with an adequate retaining force, to prevent the second wire 62 in the normal state from becoming loosened so that the seat belt anchor 56 and the seat belt buckle 57 will not be shaken or lowered.

A first pulley 71 as one example of a first guide is provided at a nodal point of the lower end portion 23A of each rear link 23. The first pulley 71 is disposed laterally outside of the rear link 23, and configured to be rotatable about a lateral axis. A second pulley 72 as one example of a second guide is provided at a nodal point of the upper end portion 23B of each rear link 23. The second pulley 72 is disposed laterally outside of the rear link 23, and configured to be rotatable about a lateral axis. The first pulley 71 and the pretensioner pulley 55 are located coaxially with each other. Therefore, these two pulleys 71, 55 can be supported on a common shaft, so that the first pulley 71 and the pretensioner pulley 55 can be provided with a small number of parts in a compact design.

The first pulley 71 and the second pulley 72 are, as will be described later, configured to have the same diameter (i.e., the same radius of curvature) so that excessive tension or excessive looseness of the connecting wire which would occur after the operation of the height adjustment mechanism 20 can be prevented.

The third wire 63 that is a portion of the connecting wire bifurcated at the bifurcation bracket 65 from the first wire 61 into the second and third wires 62, 63 extends from the third connecting portion 65C of the bifurcation bracket 65 toward rearward, and is looped around the first pulley 71 and the second pulley 72 in this order, directed at the second pulley 72 toward frontward, and connected with the connecting portion 43C of the lifting link 43. That is, the third wire 63 is connected via the lifting link 43 with the movable frame 40.

A portion of the third wire 63 extending from the second pulley 72 to the lifting link 43 is in a position laterally between the side frame 31 of the base frame 30 and the side frame 41 of the movable frame 40. As a result, the third wire 63 extending in the front-rear direction can be arranged compactly, and interference between the third wire 63 and the cushion with which the frames are covered can be prevented.

The gas cylinder 51 is disposed under the movable frame 40, i.e., under the seat bottom. The gas cylinder 51 may be disposed in any other position out of a region under the seat bottom, for example, rearward or frontward of the base frame 30. The position of the gas cylinder 51 under the seat bottom may advantageously eliminate the nuisance of the existence to of the gas cylinder for a passenger to sit on the seat, and contribute to a compact arrangement of the constitutional parts of the seat.

Operation of the car seat (vehicle seat) configured as described above will now be described in detail.

Figure 4:
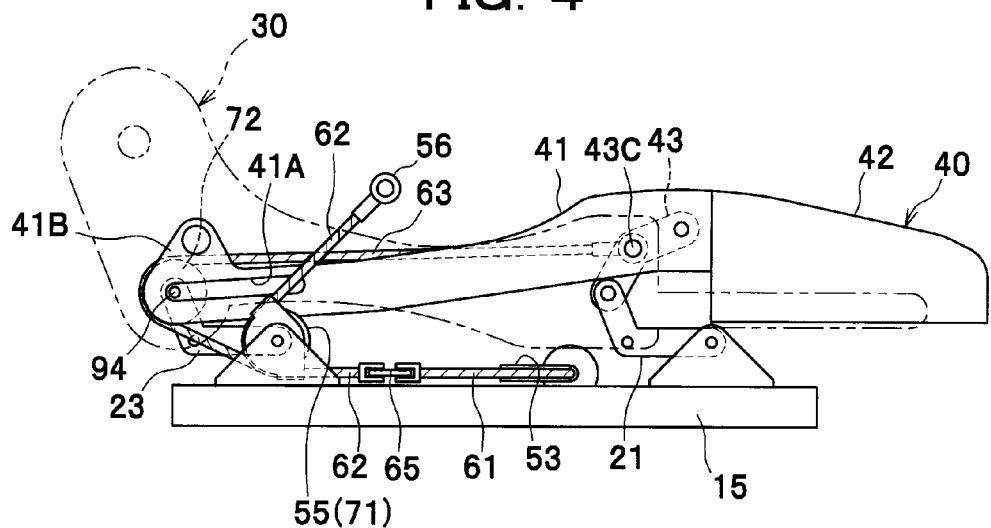
FIG. 4 is a side view of a principal portion of the car seat in the lower position before activation of a gas cylinder.

When deceleration at a predetermined value or greater occurs in the event of a frontal crash of a vehicle in which the seating surface is in the lower position as shown in FIG. 4, the acceleration sensor (not shown) provides a predetermined signal, to activate the gas generator. In response, the gas cylinder 51 shrinks, and pulls the right and left connecting wires (first wires 61).

Figure 6A:
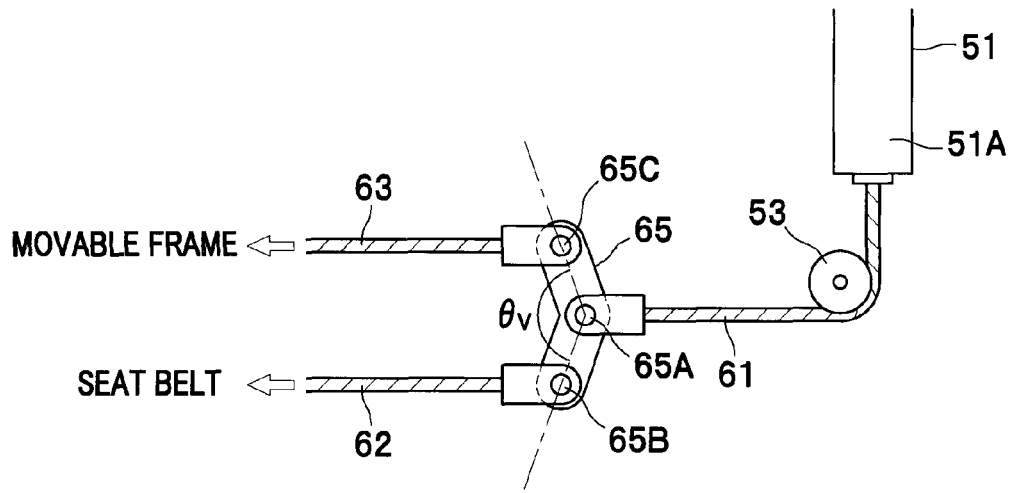
FIG. 6A is a schematic diagram for explaining a bifurcation bracket before activation of the gas cylinder.
Figure 6B:
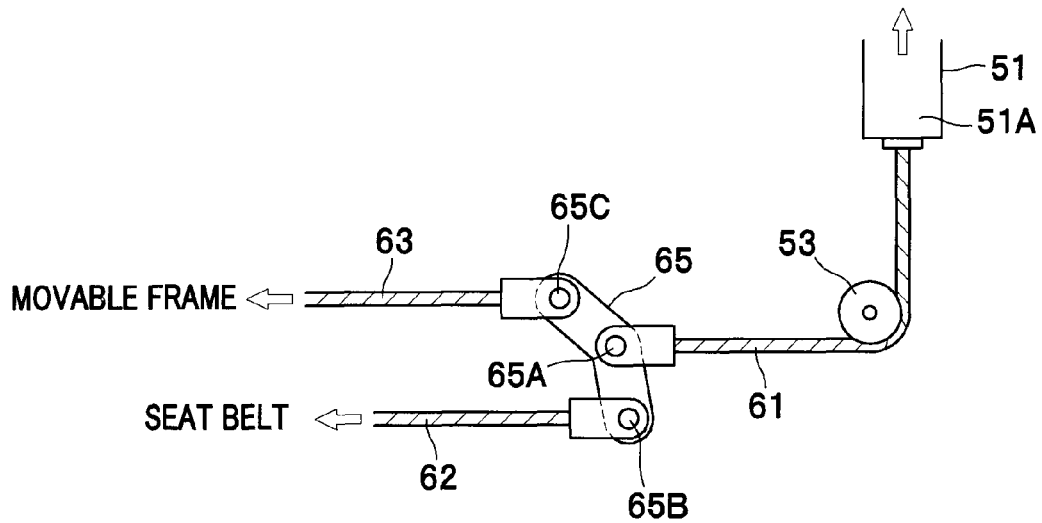
FIG. 6B is a schematic diagram for explaining the bifurcation bracket after activation of the gas cylinder.
Figure 9:
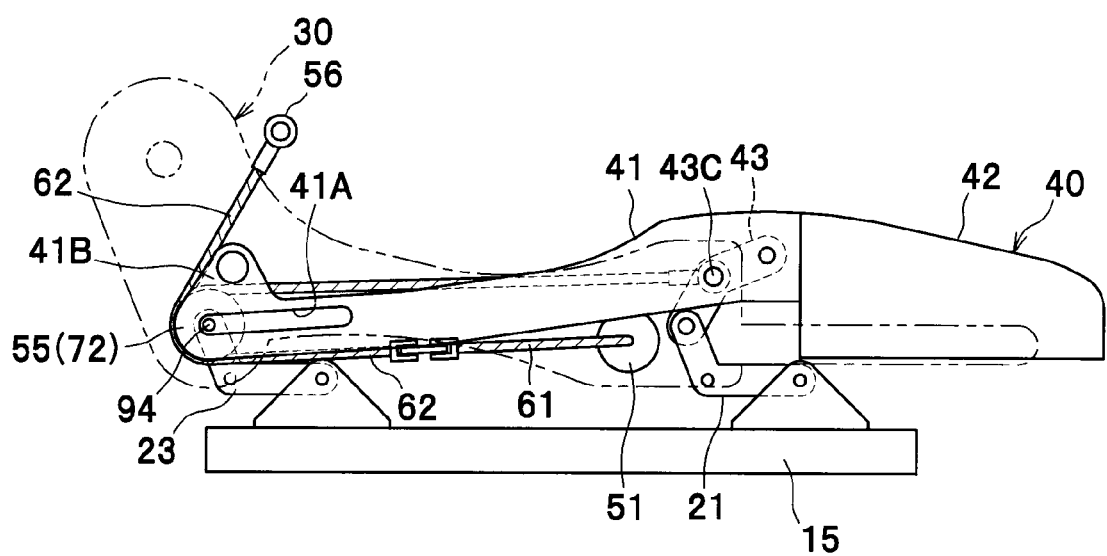
FIG. 9 is a diagram showing a modified embodiment in which a gas cylinder is provided at a base frame.

Then, the first wire 61 in the normal state as shown in FIG. 6A is pulled frontward, and the bifurcation bracket 65 is rotated about the first connecting portion 65A, for example, as shown in FIG. 6B, depending upon the loads which would be imposed unevenly on the second wire 62 and the third wire 63, and the degrees of slacking of the second wires 62 and the third wire 63 which would be out of balance therebetween. If the second wire 62 slacks more than the third wire 63, the bifurcation bracket 65 is rotated accordingly as shown in FIG. 6B so that the second connecting portion 65B is moved frontward. Conversely, if the third wire 63 slacks more than the second wire 62, the bifurcation bracket 65 is rotated accordingly in a direction reverse to that shown in FIG. 6B.

If the load imposed on the third wire 63 pulling the movable frame is greater than the load imposed on the second wire 62 pulling the seat belt, the bifurcation bracket 65 is rotated accordingly as shown in FIG. 6B so that the second connecting portion 65B is moved frontward. When the bifurcation bracket 65 is rotated, the distance between the first connecting portion 65A and the second connecting portion 65B in a direction (the upward/downward direction in FIGS. 6A and 6B) perpendicular to a direction in which the wires are pulled (the right/left direction in FIGS. 6A and 6B) becomes greater, and a force of the second wire 62 rotating the bifurcation bracket 65 becomes greater; on the other hand, the distance between the first connecting portion 65A and the third connecting portion 65C in the direction perpendicular to the direction in which the wires are pulled becomes smaller, and a force of the third connecting portion 65C rotating the bifurcation bracket 65 becomes smaller. When the force of the second wire 62 rotating the bifurcation bracket 65 and the force of the third wire 63 rotating the bifurcation bracket 65 are eventually brought into balance, the posture of the bifurcation bracket 65 comes into a stable condition. In this way, the bifurcation bracket 65 is rotated by the pulling forces of the second wires 62 and the third wires 63 as if the bifurcation bracket 65 were a balance consists of a balance beam, a pair of scales suspended from its end, and a pivotal axis (fulcrum) at its center wherein the bifurcation bracket 65 supported on the first connecting portion 65A (pivotal axis) is pulled (at its both ends) by the second wire 62 and the third wire 63, and rotated so that the two wires (second and third wires 62, 63) can be pulled with the balance kept properly adjusted.

As apparent from this operation, an adjustment may be made to the distances between the first and second connecting portions 65A and 65B, and between the first and third connecting portions 65A and 65C so that the balance can be adjusted between the forces and amounts of pulling motion imparted to the seat belt and the movable frame 40.

Figure 5:
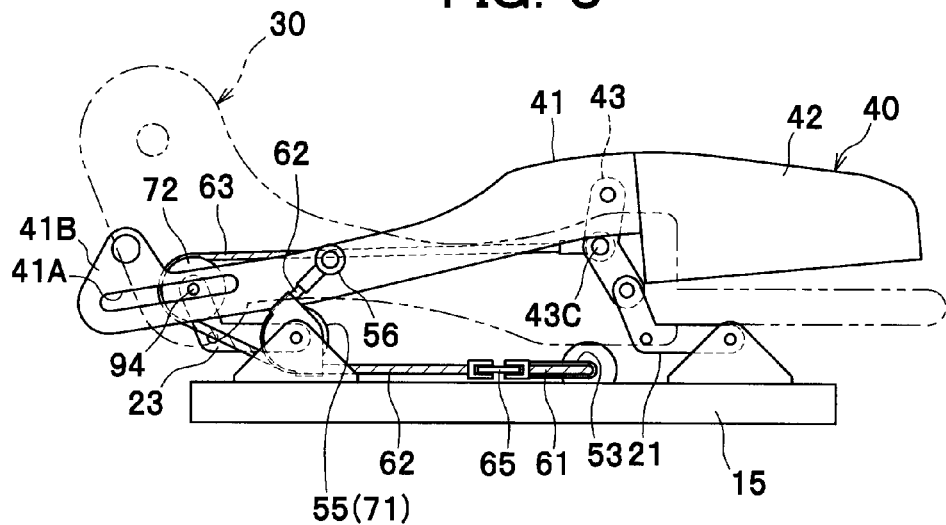
FIG. 5 is a side view of the principal portion of the car seat in the lower position after activation of the gas cylinder.

When the second wire 62 is pulled via the bifurcation bracket 65, the seat belt anchor 56 is pulled in as shown in FIG. 5. The seat belt buckle 57 (not shown) is also pulled in at the same time. Accordingly, the seat belt is fastened, and the holding force of the seat belt for the occupant secured to the seat can be increased.

When the third wire 63 is pulled via the bifurcation bracket 65, the end of the third wire 63 looped around the first and second pulleys 71, 72 and directed toward frontward is moved rearward, and the lifting link 43 is rotated about its lower end portion with its upper end moving rearward, as shown in FIG. 5. Accordingly, the movable frame 40 is moved rearward, and the front end of the movable frame 40 is moved upward along a trajectory followed by the upper connecting portion 43A of the lifting link 43. In this way, the seating surface on the cushion (not shown) is moved rearward and raised upward so that the seating surface becomes ready to more effectively resist the motion of the occupant being thrust frontward by inertia, and the holding force of the seat belt for the occupant secured to the seat can be increased.

When the height adjustment mechanism 20 is actuated for the seat with its seating surface being lowered (in the "lower position" as shown in FIG. 4), the front link 21 and the rear link 23 are rotated about the lower end portion 21A and the lower end portion 23B, respectively, with their upper ends moving frontward, until the seating surface is raised (into the "upper position" as shown in FIG. 7). In this operation, the lengths of the looped connecting wires as seen in the side view of FIGS. 4 and 7 do not change because the front link 21, the rear link 23, the slider 15 and the base frame 30 are arranged to form a parallel four-bar linkage and the diameters of the first and second pulleys 71, 72 are equal to each other. To go into details, the length of the connecting wire (first and third wires 61, 63) from the pulley 53 to the first pulley 71 does not change before and after the height adjustment, the length of the connecting wire 63 from the first pulley 71 to the second pulley 72 does not change before and after the height adjustment, and the length of the connecting wire 63 from the second pulley 72 to the connecting portion 43C of the lifting link 43 does not change before and after the height adjustment. Moreover, when the position of the seat is changed from the "lower position" to the "higher position" (by the height adjustment), a wrap angle of the third wire 63 looped around the first pulley 71 increases by an angle θ1 that is an angle of rotation of the link 21, 23 (see FIG. 7), but a wrap angle of the third wire 63 looped around the second pulley 72 is reduced by the same angle θ1. Since the diameter of the first and the second pulleys 71, 72 are equal to each other, the total length of the third wire 63 looped around the first and second pulleys 71, 72 does not change before and after the height adjustment (between the "lower position" and the "higher position"). Therefore, the length of the path from the pulley 53 to the connecting portion 43C of the lifting link 43 does not change between the "lower position" and the "higher position", and thus even when the height adjustment mechanism 20 is actuated, the connecting wire can be prevented from becoming excessively loosened and excessively tightened.

As shown in FIGS. 7, 8, when the gas cylinder 51 is activated in the seat in which the seating surface is in the higher position, the force of pulling each first wire 61 is transmitted to the second wire 62 and the third wire 63, similar to the aforementioned operation of the seat in which the seating surface is in the lower position. Then, the seat belt is pulled by the seat belt anchor 56 and the seat belt buckle 57 whereby the occupant becomes more securely tightened up so as not to separate from the seat. At the same time, the front end of the rearwardly moving movable frame 40 is moved upward so that the seating surface is caused to tilt up whereby the seating surface becomes ready to more effectively resist the motion of the occupant being thrust frontward by inertia which also serve to prevent the occupant from easily separate from the seat.

With the car seat (vehicle seat) configured as described above in accordance to the present embodiment, the following advantageous effects may be exerted.

Since the both of the movable frame 40 and the seat belt (via the seat belt anchor 56 and the seat belt buckle 57) are actuated by the single gas cylinder 51, the need to provide two gas cylinders for respective operations (actuations of the movable frame 40 and the seat belt), as the conventional seat would have, can be obviated, so that an undesirable increase in the size and weight of the seat can be prevented thanks to such a simplified design.

Since the gas cylinder 51 is disposed at the anchor portion (rail slider device 10) that is of a high rigidity enough to support the seat bottom, the operation of the gas cylinder 51 to actuating the movable frame 40 and the seat belt can be carried out in a stable manner.

Since the third wire 63 is arranged to detour rearwardly around the rear link 23 which constitutes part of the height adjustment mechanism 20, the operation of the gas cylinder 51 pulling the third wire 63 is not affected by the height adjustment operation by means of the height adjustment mechanism 20.

Since the height adjustment mechanism 20 is configured as a parallel four-bar linkage and the diameters of the first and second pulleys 71, 72 are equal to each other, the length of the path along which the third wire 63 is arranged does not change between the "lower position" and the "higher position" (i.e., before and after the height adjustment), and thus excessive tension or excessive looseness of the third wire 63 can be prevented. Since the gas cylinder 51 is disposed under the seat bottom, the vacant space can be utilized for the gas cylinder 51 and a compact design of the vehicle seat can be realized.

Since the connecting wire connected at one end of the first wire 61 with the gas cylinder 51 is bifurcated at the other end of the first wire 61 into the second and third wires 62, 63, the second wire 62 and the third wire 63 can be pulled in a stable balance. Since the second wire 62 is disposed in a position laterally outside the third wire 63, the second wire 62 can be arranged compactly while avoiding interference with the other portions of the connecting wire or other components within or in vicinity of the seat within the vehicle.

Although the exemplary embodiment of the present invention has been described above, the present invention is not limited to this embodiment, and may be carried out into practice in various other ways, as will be described below.

For example, in the above-described embodiment, two first wires 61 each configured to be bifurcated at one end thereof into the second and third wires 62, 63 are provided at both ends of the gas cylinder 51 so that one of two second wires 62 is configured to pull the seat belt anchor 56 and the other of the two second wires 62 is configured to pull the seat belt buckle 56. However, it may be configured that the seat belt is pulled at either of the seat belt anchor 56 and the seat belt buckle 57. Also, the bifurcation bracket 65 may not be provided, and the first portion and the third portion of the tension transmission member may be configured as a single wire with which the second portion is connected (or the first portion and the second portion of the tension transmission member may be configured as a single wire with which the third portion is connected, as the case may be) so that the first portion is bifurcated into the second and third portions.

In the above-described embodiment, the gas cylinder 51 is disposed at the slider 15; however, in a case for example where the vehicle seat includes no front-rear sliding mechanism, the gas cylinder 51 may be disposed at a bracket for supporting the base frame 30 (e.g., a bracket corresponding to the front or rear bracket 12, 13 provided on each rail 11).

Alternatively, the gas cylinder 51 may be provided at the base frame 30. In this alternative embodiment, the pretensioner pulley 55 may also be mounted at the base frame 30. With this configuration, the operation of the tension generator pulling the wire is not affected by the operation of the height adjustment mechanism, and thus the force pulling the wire can be simplified and the operation thereof can be stabilized with a simple configuration.

In the above-described embodiment, the height adjustment mechanism 20 is configured as a parallel four-bar linkage, but may alternatively be configured as a non-parallel four-bar linkage in which opposite links of at least one of two pairs have lengths different from each other. In this configuration, it is preferable that the diameters (radii of curvature of surfaces) of the first and second pulleys 171, 172 or 271, 272 (first and second guides) be different from each other, as shown in FIGS. 10 and 11.

Figure 10:
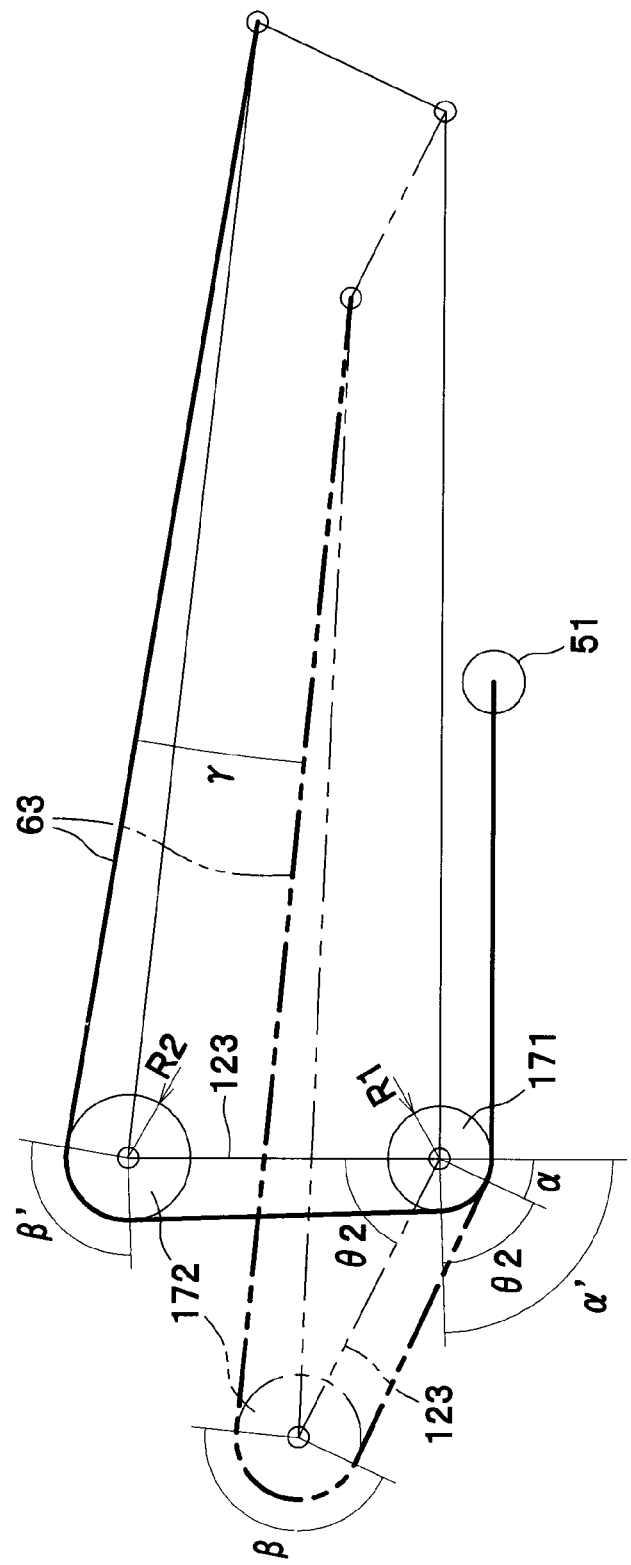
FIG. 10 is a schematic diagram for explaining a height adjustment mechanism embodied as a non-parallel four bar linkage, which is configured such that the seat bottom tilts a front end down according as the seat is raised up.
Figure 11:
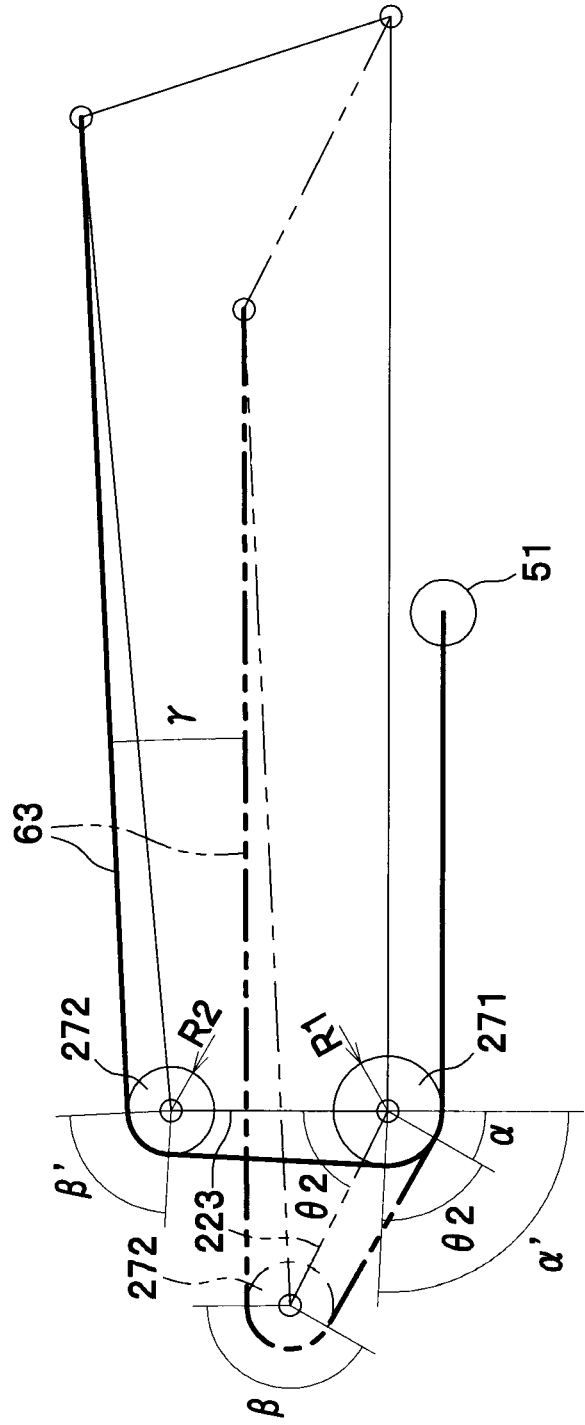
FIG. 11 is a schematic diagram for explaining a height adjustment mechanism embodied as a non-parallel four bar linkage, which is configured such that the seat bottom tilts a front end up according as the seat is raised up.

FIGS. 10 and 11 schematically illustrate the non-parallel four-bar linkage of the height adjustment mechanism 20. Denoted by chain double-dashed lines is the "lower position" (in to which the seating surface is in the lower position), denoted by solid lines is the "higher position" (in which the seating surface is in the higher position), and denoted by bold lines is the connecting wire (the first wire 61 and the third wire 63 connected end-to-end with each other).

FIG. 10 shows an example of the non-parallel linkage which is configured to tilt a front end of the seat bottom (movable frame 40) downward according as the base frame 30 is moved from the "lower position" toward the "higher position". In this example, it is preferable that the diameter of the second pulley 172 be larger than the diameter of the first pulley 172. To go into details, assuming that an angle of rotation of the rear link 123 is $\theta 2$, a wrap angle of the first pulley 171 in the "lower position" is $\alpha$, a wrap angle of the second: pulley 172 in the "lower position" is $\beta$, a wrap angle of the first pulley 171 in the "higher position" is $\alpha'$ a wrap angle of the second pulley 172 in the "higher position" is $\beta'$, and an amount of variation of the tilt angle of the movable frame 40 is $\gamma$ (positive value), where the unit of the angles is radian, the following equations are fulfilled:

$$\alpha'=\alpha+\theta 2;$$

$$\beta'=\beta-\theta 2+\gamma.$$

The length of a portion of the third wire 63 looped around the first pulley 171 is increased by (R1 multiplied by $\theta 2$), and the length of a portion of the third wire 63 looped around the second pulley 172 is reduced by (R2 multiplied by ($\theta 2$-$\gamma$)), where the diameter of the first pulley 171 is R1 and the diameter of the second pulley 172 is R2. Therefore, in order to render the tension of the connecting wire less prone to change before and after operation of the height adjustment Mechanism 20 (i.e., between the "lower position" and the "higher position"), it is preferable that the difference between the value (R1 multiplied by $\theta 2$) and the value (R2 multiplied by ($\theta 2$-$\gamma$)) be minimized; therefore, R1<R2 is preferable.

FIG. 11 shows another example of the non-parallel linkage which is configured to tilt to the front end of the seat bottom (movable frame 40) upward according as the base frame 30 is moved from the "lower position" toward the "higher position". In this example, it is preferable that the diameter of the second pulley 272 be smaller than the diameter of the first pulley 271. The reason of this is opposite to the aforementioned example shown in FIG. 10; that is, the following equations are fulfilled:

$$\alpha'=a+\alpha 2;$$

$$\beta'=\beta-\theta 2-\gamma.$$

The length of a portion of the third wire 63 looped around the first pulley 271 is increased by (R1 multiplied by $\theta 2$), and the length of a portion of the third wire 63 looped around the second pulley 272 is reduced by (R2 multiplied by ($\theta 2$+$\gamma$)), where the diameter of the first pulley 271 is R1, the diameter of the second pulley 272 is R2, and $\gamma$ is the amount of variation assumed to be a positive value. Therefore, in order to render the tension of the connecting wire less prone to change before and after operation of the height adjustment mechanism 20 (i.e., between the "lower position" and the "higher position"), it is preferable that the difference between the value (R1 multiplied by $\theta 2$) and the value (R2 multiplied by ($\theta 2$+$\gamma$)) be minimized; therefore, R1>R2 is preferable.

In the above-described embodiment, the gas cylinder 51 is adopted as a tension generator, but the present invention is not limited to this specific example; for example, a spring or a motor may be used, instead.

The connecting wire may be replaced with any other type of tension transmission member, such as a belt, or a chain, which is capable of transmitting a tension.

In the above-described embodiment, rotatable pulleys are adopted by way of example as guides for changing the direction of the force transmitted through the second and third wires 62, 63; however, the present invention is not limited to this specific configuration. For example, a non-rotatable member having a cylindrical surface around which a wire or other tension transmission member is looped may be adopted, instead.

In the above-described embodiment, the movable frame 40 (i.e., the seating surface of the seat bottom) is configured to be moved rearward in response to an impact to be exerted on the seat in the event of a frontal crash, but the direction of movement is not limited to "rearward"; for example, the seating surface of the seat bottom may be configured to be moved in such a manner that the front end of the seat bottom is raised up or that the rear end of the seat bottom is lowered down.

The above-described embodiment is configured such that only the movable frame 40 is moved, but the base frame 30 is not moved, in response to an impact to be exerted on the seat in the event of a frontal crash. However the present invention is not limited to this specific configuration. For example, the base frame 30 may optionally be configured to be moved relative to body of the vehicle to some extent in response to the impact to be exerted on the seat in the event of a frontal crash.

In the above-described embodiment, a car seat is illustrated as an example of a vehicle seat, but the vehicle seat to which the present invention is applicable is not limited to the illustrated car seat. For example, a seat for a vessel (a ship or a boat), a seat for an aircraft, or other vehicles may be advantageously configured in accordance with the present invention.

It is to be understood that the "front" used in describing the present invention refers to the front side of an occupant sitting on the seating surface of the seat of the vehicle; that is, in cases where the seat is disposed with its front side oriented backward in relation to the direction of movement of the vehicle, the backward direction in the direction of movement of the vehicle is considered to be the "front" side of an occupant. In this context, the frontal crash occurs when the vehicle collides against another vehicle or other object from backward.

What is claimed is:

1. A vehicle seat comprising a seat bottom with a seating surface configured to be moved in response to an impact from a direction corresponding to a front side of an occupant sitting on the seating surface in a crash of a vehicle, the seat bottom including:
   a base portion configured to be supported at a position fixed relative to a body of the vehicle, said base portion including a base frame;
   a movable frame configured to be movable together with the seating surface, said movable frame configured to be movable together with the base frame upward and downward relative to the body of the vehicle, said movable frame being coupled with the base frame in a manner that permits the movable frame to move forward and rearward with respect to the base frame;
   a tension generator provided at and connected to the base portion and configured to be activated in response to the impact; and
   a tension transmission member including a first portion, a second portion and a third portion, the tension transmission member being connected at one end of the first portion with the tension generator, and bifurcated at another end of the first portion into the second and third portions which another end of the first portion is connected with one end of the second portion and with one end of the third portion, the tension transmission member being connected at another end of the third portion with the movable frame,
   whereby a tension generated by the tension generator activated causes the third portion of the tension transmission member to pull the movable frame rearward and at the same time causes the second portion of the tension transmission member to pull the seat belt anchor or the seat belt buckle.

2. The vehicle seat according to claim 1, wherein the base portion includes:
   an anchor portion configured to be fixed to the body of the vehicle; and
   a height adjustment mechanism configured to provide a connection between the anchor portion and the base frame in a manner that enables an adjustment of a height of the base frame.

3. The vehicle seat according to claim 2, wherein the tension generator is provided at the anchor portion of the base portion.

4. The vehicle seat according to claim 2, wherein the tension generator is provided at the base frame.

5. The vehicle seat according to claim 2, wherein the height adjustment mechanism includes a front link and a rear link which are joined with the anchor portion and the base frame in such a manner that the front link, the rear link, the anchor portion and the base frame form a four-bar linkage;
   the vehicle seat further comprises a first guide disposed at and coaxially with a nodal point between the rear link and the anchor portion, and a second guide disposed at and coaxially with a nodal point between the rear link and the base frame; and
   the third portion extending from the one end thereof at which the tension transmission member is bifurcated is looped around the first guide and the second guide in this order, and directed at the second guide toward frontward, wherein the another end of the third portion is connected with the movable frame.

6. The vehicle seat according to claim 5, wherein the four-bar linkage is parallel linkage, and radii of curvature of surfaces of the first and second guides around which the third portion of the tension transmission member is looped are equal to each other.

7. The vehicle seat according to claim 5, wherein the four-bar linkage is a non-parallel linkage in which opposite links of at least one of two pairs have lengths different from each other, and which is configured to tilt a front end of the base frame downward according as the base frame is moved toward a higher position by means of the height adjustment mechanism; and
   a radius of curvature of a surface of the second guide around which the third portion of the tension transmission member is looped is greater than that of a surface of the first guide around which the third portion of the tension transmission member is looped, whereby a tension of the tension transmission member is less prone to change before and after operation of the height adjustment mechanism.

8. The vehicle seat according to claim 5, wherein the four-bar linkage is a non-parallel linkage in which opposite links of at least one of two pairs have lengths different from each other, and which is configured to tilt a front end of the base frame upward according as the base frame is moved toward a higher position by means of the height adjustment mechanism; and
   a radius of curvature of a surface of the second guide around which the third portion of the tension transmission member is looped is smaller than that of a surface of the first guide around which the third portion of the tension transmission member is looped, whereby a tension of the tension transmission member is less prone to change before and after operation of the height adjustment mechanism.

9. The vehicle s eat according to claim 1, wherein the second portion of the tension transmission member is located in a position laterally outside the third portion of the tension transmission member.

10. The vehicle seat according to claim 1, wherein the tension generator is disposed under the seating surface.

11. A vehicle seat comprising a seat bottom with a seating surface configured to be moved in response to an impact from a direction corresponding to a front side of an occupant sitting on the seating surface in a crash of a vehicle, the seat bottom including:
    a base portion configured to be supported at a position fixed relative to a body of the vehicle;
    a moveable frame configured to be movable together with the seating surface in a front-rear direction relative to the base portion;
    a tension generator provided at the base portion and configured to be activated in response to the impact;
    a tension transmission member including a first portion, a second portion and a third portion, the tension transmission member being connected at one end of the first portion with the tension generator, and bifurcated at another end of the first portion into the second and third portions which another end of the first portion is connected with one end of the second portion and with one end of the third portion, the tension transmission member being connected at another end of the second portion with a seat belt anchor or a seat belt buckle and connected at another end of the third portion with the movable frame;
    a bifurcation bracket by means of which the first, second and third portions of the tension transmission member are connected together, the bifurcation bracket including a first connecting portion with which the first portion is connected, a second connecting portion with which the second portion is connected, and a third connecting portion with which the third portion is connected, wherein the bifurcation bracket is configured such that the first, second and third connecting portions are located at apexes of a triangle.

12. The vehicle seat according to claim 11, wherein an interior angle of the triangle formed at the first connecting portion is an obtuse angle.

13. The vehicle seat according to claim 11, wherein the second and third connecting portions are arranged laterally.

14. A vehicle seat comprising a seat back and a seat bottom configured such that a seating surface provided on the seat bottom is moved rearward relative to the seat back in response to an impact from a direction corresponding to a front side of an occupant sitting on the seating surface in a crash of a vehicle, the seat bottom including:
   a base portion configured to be supported at a position fixed relative to a body of the vehicle;
   a movable frame configured to be movable together with the seating surface in a front-rear direction relative to the base portion;
   a single tension generator including a cylinder and a piston rod, the tension generator being provided at the base portion and disposed transversely under the seating surface with ends of the cylinder and the piston rod facing away from each other toward sides of the seat bottom and configured to be activated in response to the impact; and
   a pair of first and second tension transmission members provided at the sides of the seat bottom, each tension transmission member including a first portion, a second portion and a third portion, the first tension transmission member being connected at one end of the first portion with the cylinder of the tension generator, and bifurcated at another end of the first portion with the cylinder of the tension generator, and bifurcated at another end of the first portion into the second and third portions which another end of the first portion is connected with one end of the second portion and with one end of the third portion, the tension transmission member being connected at another end of the second portion with one of a seat belt anchor and a seat belt buckle and connected at another end of the third portion with the movable frame, the second tension transmission member being connected at one end of the first portion with the piston rod of the tension generator, and bifurcated at another end of the first portion into the second and third portions which another end of the first portion, the tension transmission member being connected at another end of the second portion, with the other of the seat belt anchor and the seat belt buckle and connected at another end of the third portion with the moveable frame,
   whereby a tension generated by the tension generator activated causes the third portions of the first and second tension transmission members to pull the movable frame rearward and at the same time causes the second portions of the first and second tension transmission members to pull the seat belt anchor or the seat belt buckle.

15. The vehicle seat according to claim 14, wherein the base portion includes:
   an anchor portion configured to be fixed to the body of the vehicle;
   a base frame coupled with the movable frame in a manner that permits the movable frame to move frontward and rearward relative to the base frame; and
   a height adjustment mechanism configured to provide a connection between the anchor portion and the base frame in a manner that enables an adjustment of a height of the base frame.

16. The vehicle seat according to claim 15, wherein the tension generator is provided at the anchor portion of the base portion.

17. The vehicle seat according to claim 15, wherein the tension generator is provided at the base frame.

18. The vehicle seat according to claim 15, wherein the height adjustment mechanism includes a front link and a rear link which are joined with the anchor portion and the base frame in such a manner that the front link, the rear link, the anchor portion and the base frame form a four-bar linkage;
   The vehicle seat further comprises a first guide disposed at and coaxially with a nodal point between the rear link and the anchor portion, and a second guide disposed at and coaxially with a nodal point between the rear link and the base frame; and
   The third portion extending from the one end thereof at which the tension transmission member is bifurcated is looped around the first guide and the second guide in this order, and directed at the second guide toward frontward, wherein the another end of the third portion is connected with the moveable frame.

19. The vehicle seat according to claim 14, wherein the second portion of the tension transmission member is located in a position laterally outside the third portion of the tension transmission.

20. The vehicle seat according to claim 14, wherein the tension generator is disposed under the seating surface.

* * * * *